United States Patent

[11] 3,614,432

| [72] | Inventor | Donald T. Green<br>Shaker Heights, Ohio |
|---|---|---|
| [21] | Appl. No. | 806,860 |
| [22] | Filed | Mar. 13, 1969 |
| [45] | Patented | Oct. 19, 1971 |
| [73] | Assignee | Picker Corporation<br>White Plains, N.Y. |

[54] METHOD AND APPARATUS FOR INSPECTING PLY SPLICES OF TIRES BY MEANS OF X-RAYS
13 Claims, 10 Drawing Figs.

| [52] | U.S. Cl. | 250/52, 250/83.3 D, 250/105 |
|---|---|---|
| [51] | Int. Cl. | G01n 23/08 |
| [50] | Field of Search | 73/146; 250/52, 83.3 D, 105, 237 |

[56] References Cited
UNITED STATES PATENTS

| 2,097,760 | 11/1937 | Failla | 250/83.3 |
|---|---|---|---|
| 2,301,251 | 11/1942 | Capen | 250/52 |
| 2,339,550 | 1/1944 | Bosomworth | 250/52 |
| 2,965,758 | 12/1960 | Malick | 250/83.3 |
| 3,024,363 | 3/1962 | Strandell | 250/83.3 |
| 3,158,744 | 11/1964 | Bernstein | 250/52 X |

*Primary Examiner*—William F. Lindquist
*Attorney*—Watts, Hoffmann, Fisher & Heinke ABSTRACT: Inspection apparatus for tires wherein a tire is rotated about its axis and subjected to X-rays which are beamed through the tire wall to X-ray-detecting devices. The X-ray-detecting devices are constructed and arranged so that the tire wall is inspected to determine whether the plies in the tire are properly constructed.

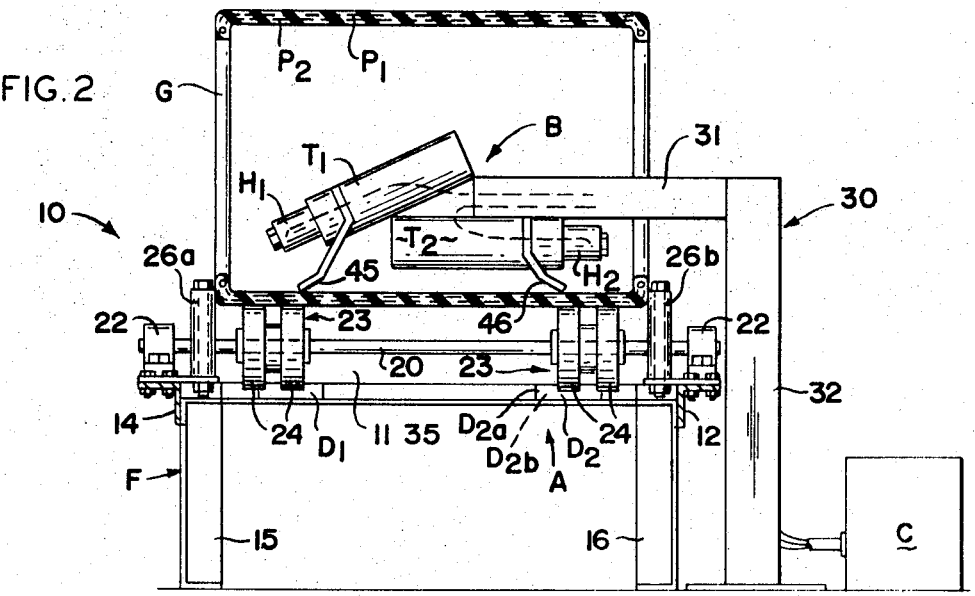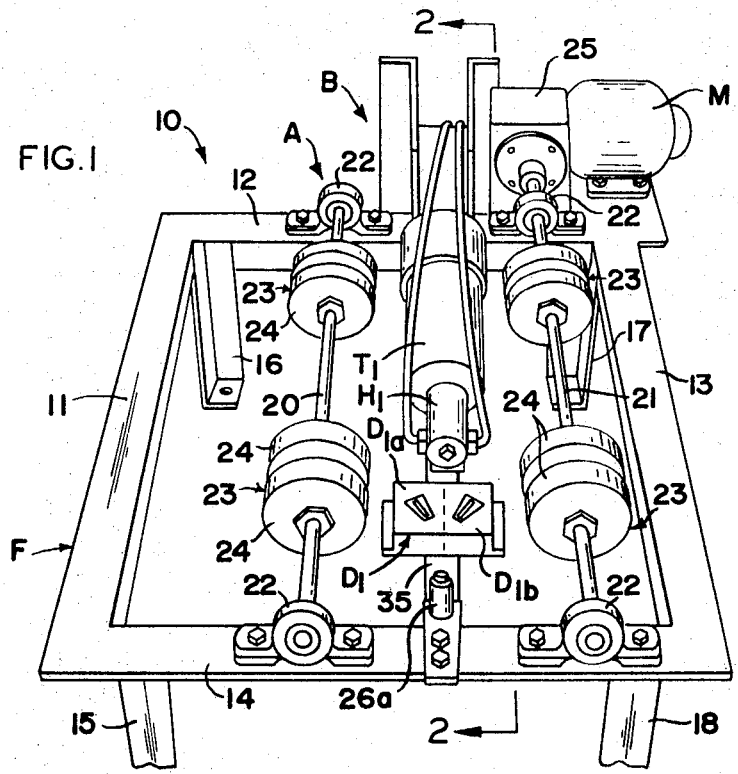

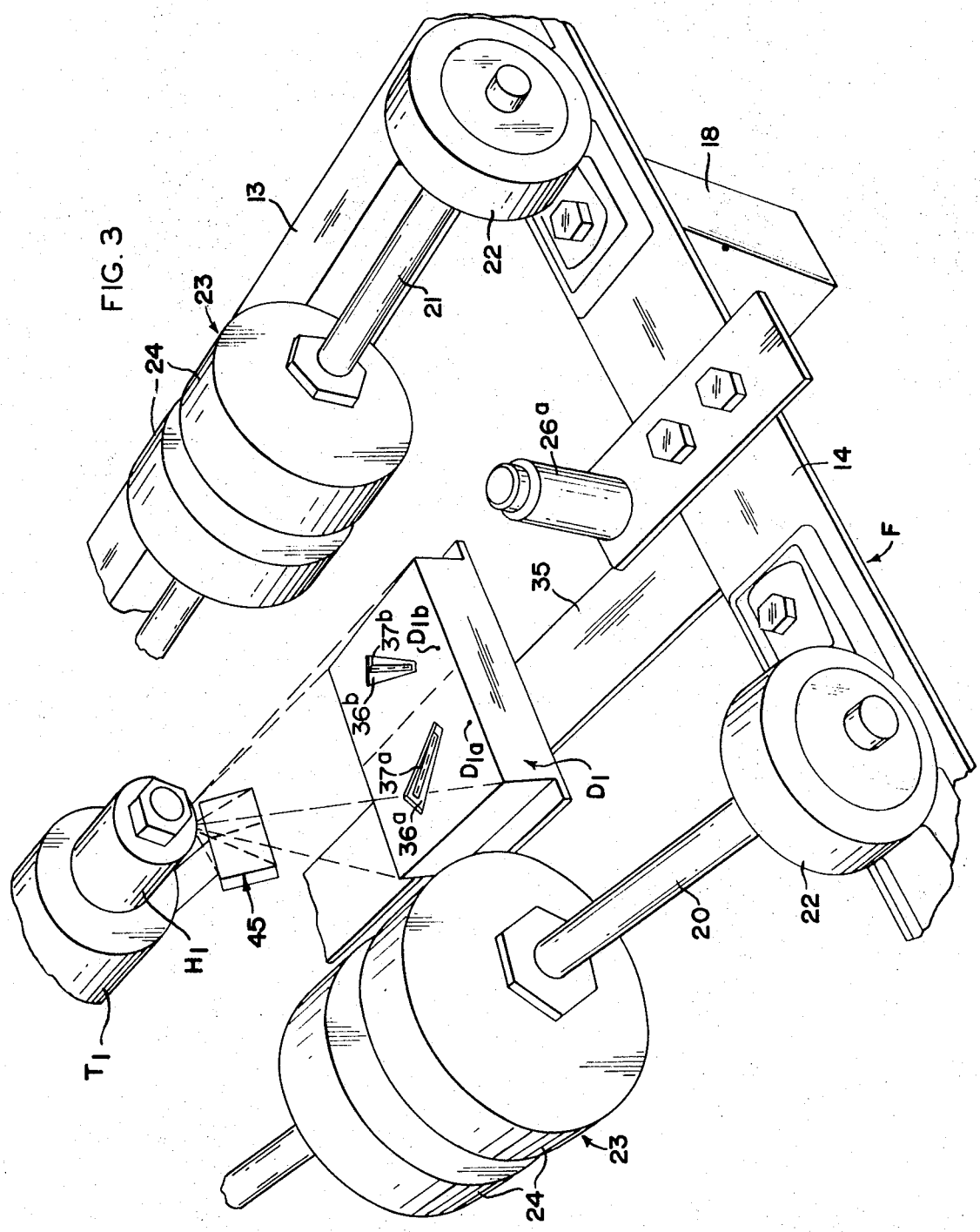

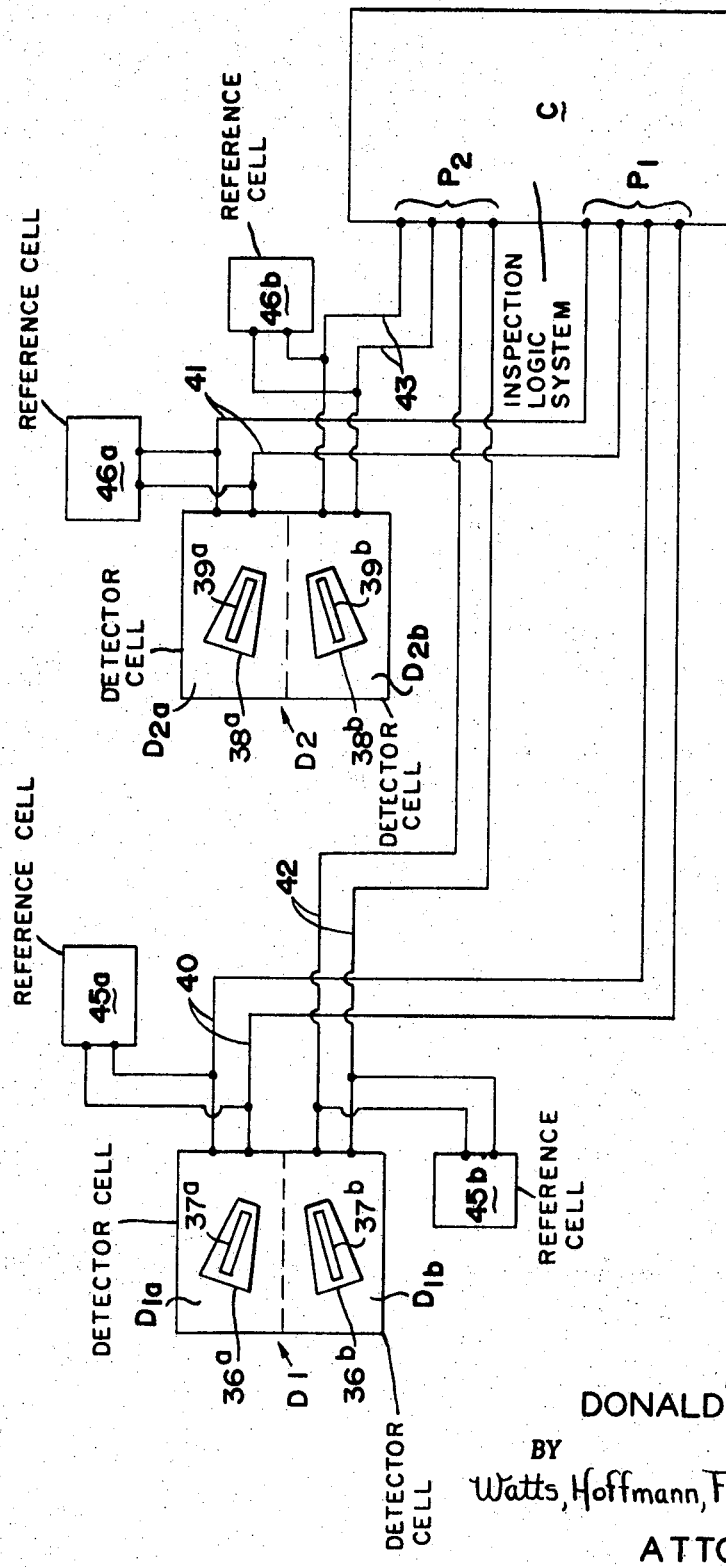

INVENTOR.
DONALD T. GREEN

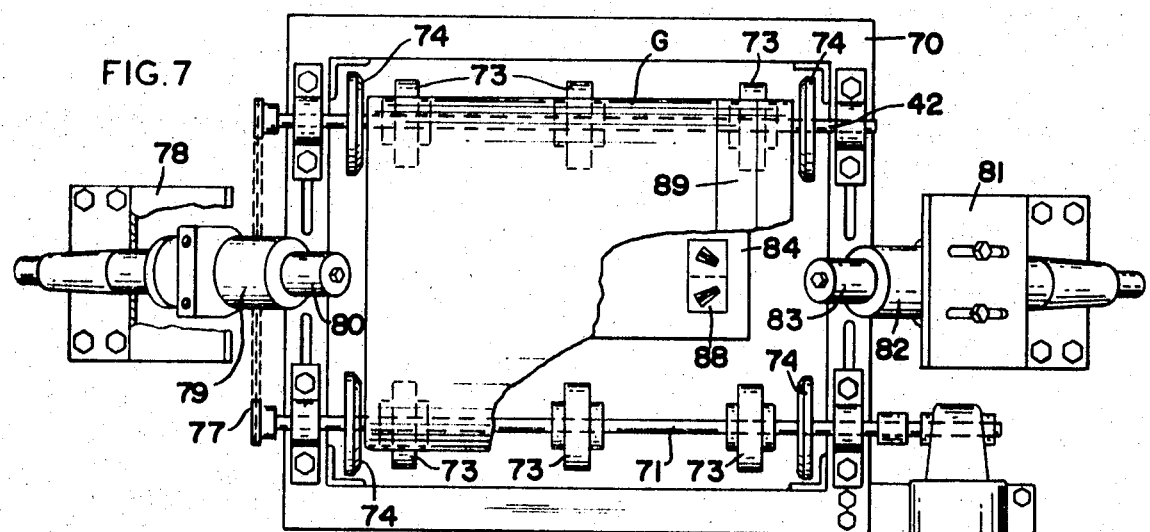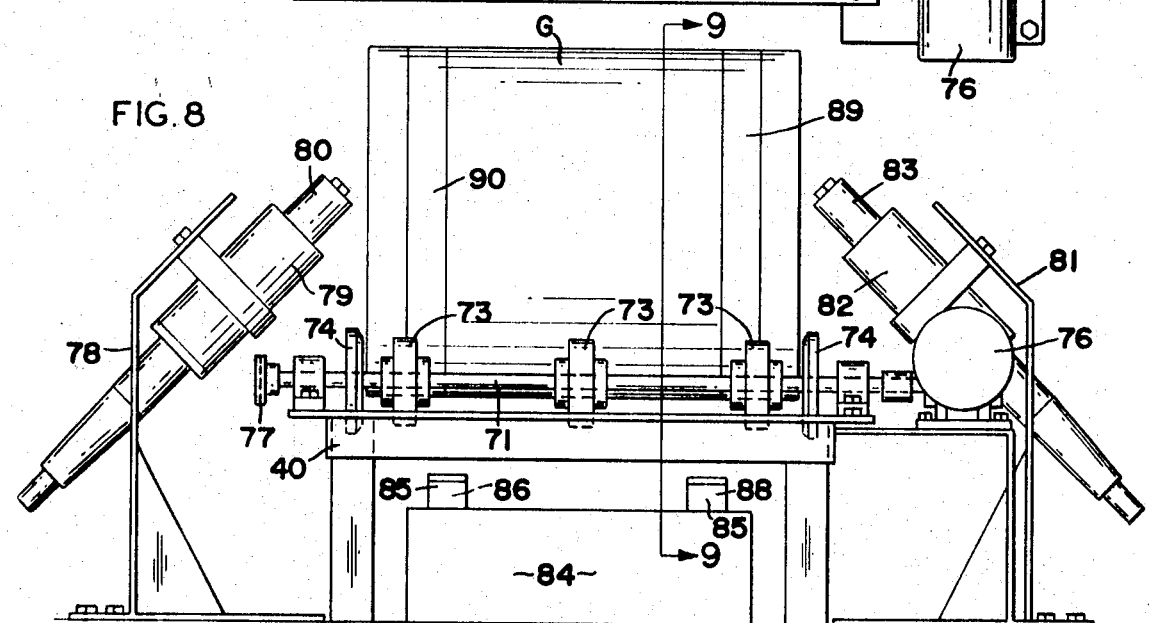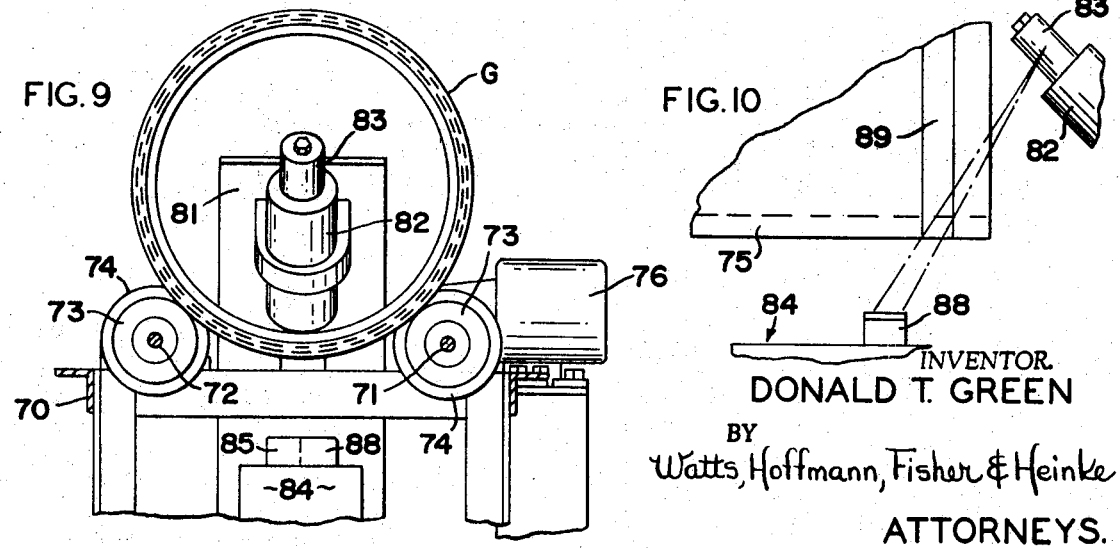

METHOD AND APPARATUS FOR INSPECTING PLY SPLICES OF TIRES BY MEANS OF X-RAYS

REFERENCED PATENT APPLICATION

U.S. application Ser. No. 818,697, filed Apr. 23, 1969 by Norman A. Herrick for "X-ray Inspection Apparatus Logic Circuitry," and assigned to the assignee of this application.

BACKGROUND OF THE INVENTION

1. Field of the Invention

The present invention relates to a method and apparatus for inspecting articles and more particularly relates to a method and apparatus for automatically inspecting articles for defects and out-of-tolerance conditions by the use of X-rays.

2. Discussion of the Prior Art

In the past, numerous devices have been constructed to inspect articles of manufacture utilizing X-ray equipment. Such equipment has primarily been utilized to detect voids or discontinuities in articles such as castings, artillery shells, tires, etc. X-ray equipment has also been used to inspect certain aspects of the construction of articles, but normally this inspection process has been time consuming and has required the presence of a skilled human inspector.

An example of articles which are particularly susceptible to X-ray inspection methods are tires, since tires contain plies of cords which must be related in a particular way. These plies, of course, are not accessible to normal inspection devices because they are bonded in the tire body.

Uncured, or green, tires are generally cylindrical in form and consist of a cylindrical rubber body having fabric plies consisting of cords imbedded in the rubber. The cords of each ply are overlapped to define a "splice" at their ends. The cords are typically disposed on a bias in the tire so that the splices in a green tire define a helical line extending partially about the cylindrical body. In a two-ply tire the helical splices in one ply are disposed at angles with respect to the splices in the other ply. Thus the splices in respective plies are generally transverse to each other, or lie on lines which intersect at relatively large angles of the order of 45° or more.

The nature of the splices in tire plies is important to the performance and durability of a finished tire; for example, defective splices cause imbalance of a tire, weak spots, etc. Accordingly, it is desirable to inspect the plies and particularly the splices.

In an acceptable two-ply tire each ply consists of two sections of cords. Hence each ply has two splices. The splices in each ply are spaced circumferentially apart so that a splice in one ply does not cross a splice in the other ply. The splices in the same ply are also spaced apart a distance of, for example, not less than two inches. If the ends of the cord sections are spaced apart, even slightly, the tire is unacceptable. Additionally, a splice can be tapered (i.e., overlapped more at one side of the tire than at the other) to an extent which is unacceptable even though the overlap at any given location along the splice is within tolerance.

It is apparent from the foregoing that in order to adequately inspect a tire, the splices in each ply must be inspected for proper orientation with respect to each other, as well as to determine whether each individual splice is within dimensional tolerance. Additionally, there cannot be more or less than, for example, two splices in each ply, and they must be spaced apart by more than a predetermined distance.

Because of the large volume production of tires, it is also a requisite of apparatus for inspecting such tires that the inspection take place in a minimum of time. For example, in some instances the inspection of a tire must occur during a period of no longer than five seconds to avoid serious delays in production. Furthermore, not only must inspection be quickly accomplished, but the inspection apparatus must be constructed so that tires can be readily placed in the apparatus, inspected and removed from the apparatus.

Some prior art proposals for X-ray inspection equipment have utilized a fluorescent screen, sometimes in combination with an image intensifier, which must be continuously viewed by a human inspector. Such devices, for example, are used in the tire manufacturing industry to detect defects in tires. Other proposals have provided for X-ray inspection of tires mounted on vehicle wheels so that nails, etc., can be located. Use of the equipment of these proposals has necessarily taken undesirably long periods of time for inspection and the equipment has not been automatic; the presence of a human inspector is necessary to interpret the images formed by the X-ray equipment. Furthermore, the inspection personnel must be skilled in interpreting the images produced by the equipment.

Other proposed systems have inspected articles for voids or the presence of foreign matter in articles of manufacture automatically, i.e., without the aid of skilled inspectors, but theses systems have not contemplated the inspection of the details of construction of the articles, and have been limited to articles having particular configurations and sizes, e.g., artillery shells.

Accordingly, a principal object of the present invention is the provision of a new and improved inspection method and apparatus wherein articles are inspected for defects and out-of-tolerance conditions extremely quickly by the use of X-ray beams and detecting devices and without requiring the presence of a human inspector.

SUMMARY OF THE INVENTION

According to the present invention, inspection of articles is effected by directing X-rays through the articles as the X-ray tube and article move relative to each other at a constant, known speed. The intensities of X-rays which have passed through the article are detected. The X-rays pass through the articles along a scanning path and the variation detected X-ray intensity, as a function of the speed of relative movement, provides the necessary inspection information. This information, in the form of electrical signals, is electrically processed so that the results of inspection are obtained automatically and extremely quickly.

Apparatus according to the invention is particularly adapted to inspect tires. In a preferred form of the invention, a green tire is received in apparatus for supporting the tire while rotating it about its axis. An X-ray tube and an X-ray-detecting device are positioned on opposite sides of the tire so that X-rays are beamed through the tire from the tube to the detecting device.

As the tire is rotated, the transparency of the tire to X-rays at any given location determines the strength of the X-rays detected by the detecting device. When a splice in a ply of the tire passes between the tube and a detecting device, that spliced portion of the tire is of greater opacity than unspliced portions and, accordingly, the strength of the detected X-ray beam is decreased. On the other hand, an "open splice," i.e., where the ends of the cord sections are spaced apart, passes through the X-ray beam, the strength of the detected X-ray beam is increased. Changes in detected beam strength produce electrical signals which are processed in such a way that an automatic and immediate indication of rejection or acceptability of the tire is produced.

The tire support structure is constructed so that the tire is rotated at a constant, known speed. Thus, in the case of a splice, the duration of the reduced strength of the X-ray beam falling upon the X-ray-detecting device indicates the amount of overlap of the cord sections. In this manner, the overlap of splices can be checked for out-of-tolerance conditions.

In a preferred form of the invention, each ply of the two-ply tire is scanned for defects along circumferential scan paths about the tire wall. The scan paths are spaced apart axially along the cylindrical tire. As a result of such an arrangement, the splices in each ply are inspected at two locations for unacceptable splice formation.

BRIEF DESCRIPTION OF THE DRAWINGS

FIG. 1 is a perspective view of inspection apparatus embodying the present invention;

FIG. 2 is a cross-sectional view as seen from the plane indicated by the line 2—2 of FIG. 1 and showing a tire in place for inspection;

FIG. 3 is a perspective view of a portion of the apparatus of FIG. 1 seen from a different vantage point and on a larger scale than that of FIG. 1;

FIG. 4 is a block diagram of the electrical portion of the apparatus of FIG. 1;

FIG. 7 is a plan view of modified inspection apparatus embodying the present invention;

FIG. 8 is a front elevational view of the apparatus of FIG. 7;

FIG. 9 is a sectional view of the apparatus as seen from the plane indicated by the line 9—9 in FIG. 8; and FIG. 10 is a fragmentary view of a portion of the apparatus of FIG. 8.

DESCRIPTION OF PREFERRED EMBODIMENTS

Figure 5:
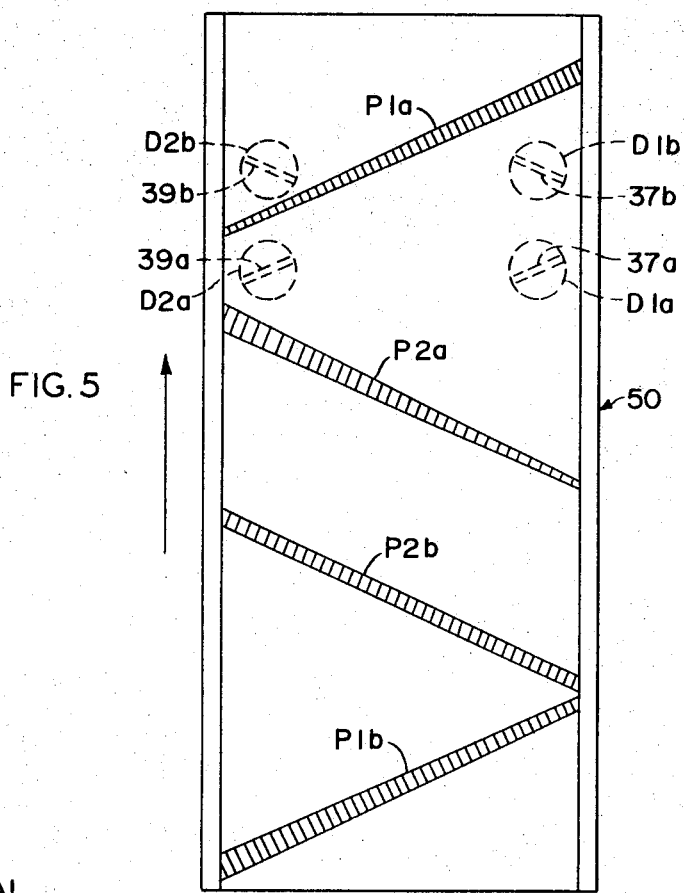
FIG. 5 is a view of an article being inspected by the apparatus embodying the invention.

Although the invention is useful in inspecting cylindrical articles in general, it will be described in the context of a green tire inspection apparatus. Therefore, a preferred embodiment of the invention for that use is illustrated in FIGS. 1-3. As shown, the inspection apparatus includes a frame structure F, a drive unit A for supporting and rotatably driving a green tire G about its longitudinal axis, an X-ray system B, and an inspection logic system, illustrated as a block C.

The frame F is constructed from four structural angle irons 11-14, which are connected together at their ends to define a horizontally disposed generally rectangular framework. The angle irons 11-14 are supported above a floor by vertical legs 15-18 in the form of angle irons.

The drive unit A, which is supported by the frame F, includes an electric motor M and tire-supporting shafts 20, 21, one of which is driven by the motor M. The shafts 20, 21 are rotatably mounted upon the frame F and extend between the angle irons 12, 14 approximately parallel to the angles 11, 13. The ends of the shafts 20, 21 are disposed in suitable bearings associated with pillow blocks 22 fixed to the frame members 12, 14. Each shaft 20, 21 carries a pair of tire-engaging roller assemblies 23 which are fixed to the shafts for rotation therewith.

Each roller assembly 23 includes a pair of tire-engaging wheels 24 which are constructed of a material which exhibits a high coefficient of friction with a green tire. The electric motor M is a synchronous electric motor, and when energized from a suitable power supply rotates at a constant, known speed. The motor M is geared to the shaft 21 through a conventional reduction gear transmission 25, so that the shaft 21 is driven at a constant speed proportional to the speed of rotation of the motor M. The shaft 20 is an idler shaft and, because it is mounted in the bearings and pillow blocks 22, it freely rotates as the green tire is driven from the shaft 21. Because of the construction of the drive unit A, as described, a green tire is supported and rotated in the inspection apparatus at a constant, known speed of rotation, preferably at least 12 r.p.m. A pair of vertically extending rollers 26a, 26b are disposed on the frame F to maintain the tire in position axially with respect to the roller assemblies 23.

The green tire G is an uncured two-ply tire. Green tires are intermediate articles in the production of finished tires and are referred to as "green" because they are uncured. In this stage of the manufacturing process plies P1, P2 (FIG. 2) of the tire are embedded in a rubber body and metallic beads have also been embedded in a rubber body and metallic beads have also been embedded in the tire. The green tire is essentially a cylinder with the beads extending about the periphery at each edge. The diameter of this cylinder is essentially the diameter of the hub upon which the finished product will be disposed, e.g., 15 inches.

Referring more specifically to FIG. 2, the X-ray system B includes a pair of X-ray tube assemblies T1, T2 which are suspended over the frame F by a supporting structure 30. The structure 30 includes a vertically extending channel 32 and a horizontal channel 31 which supports the X-ray tubes T1, T2 in cantilever fashion above the frame F. The horizontal channel 31 opens upwardly and provides a convenient support of power cables, coolant conduits, etc., (shown schematically) associated with the tube T1, T2.

The tubes T1, T2 are oriented so that when a green tire G is disposed on the apparatus as shown, the tubes T1, T2 are suspended within the tire.

The X-ray system B additionally includes X-ray detector assemblies D1, D2 positioned to receive X-rays from the tubes T1, T2 respectively. The detectors D1, D2 are supported on a crosspiece 35 which extends between the angles 12, 14 at a location medially of the pillow block 22. Hence the detectors D1, D2 are positioned adjacent the outer surface of the green tire near its edges.

The tubes T1, T2 are located so that respective X-ray heads H1, H2 of the tubes lie substantially in a common horizontal plane. For this reason, the tube T1 is disposed above and at an angle with respect to the tube T2; the X-ray heads H1, H2 are displaced along a line parallel to the axis of the tire G. The detectors D1, D2 are likewise supported by the crosspiece 35 on a line parallel to the axis of the tire. Thus, the distances between each detector and the head of its associated X-ray tube are substantially the same.

The detector D1 includes two radiation responsive or detector cells D1a, D1b, and the detector D2 includes similar cells D2a, D2b, all of which produce electrical signals in response to reception of X-rays. The amplitude of the electrical signal produced by any one of these detector cells is directly proportional to the intensity of the X-ray beam received. Each detector cell is connected to the inspection logic unit C through appropriate electrical conductors, as will be described later in more detail.

The inspection logic system can be of any suitable construction and therefore illustrated schematically only. Such a system includes circuitry for processing the signals from the detectors D1, D2 to produce a usable output. The output can be in the form of a visual or audio signal indicating whether a tire meets specifications, can be used to effect appropriate marking of inspected tires, or may be in graphical form. Preferably, the inspection logic system is constructed in accordance with the system disclosed in the referenced U.S. Patent application, to which reference should be made for a full understanding of a typical logic system.

As has been previously pointed out, the green tire G is a two-ply tire and the detectors D1, D2 cooperate to inspect both plies in the tire. The detector cells D1a, D1b are shown in most detail in FIG. 3. The head H1 of the tube T1 is positioned to direct X-rays through the wall of the tire and onto the detector D1. Thus, the detector cells D1a, D1b are exposed to X-radiation from the tube T1 which has passed through the tire G. Each X-ray detector cell D1a, D1b may comprise a suitable X-ray to-light converter (for example, a thin sodium iodide crystal) coupled optically to a photomultiplier tube (not shown). Alternatively, the detector cells may be directly responsive to X-rays and not require the intermediate step of converting the X-rays into visible light. Both such types of detectors are known in the art.

When X-rays impinge on it, each detector cell D1a, D1b provides an electrical signal whose amplitude is proportional to the intensity of the incident X-radiation. Abrupt changes in incident radiation result in signal changes which are usable to indicate the extent and sense of the changes in X-ray intensity. Masks 36a, 36b are respectively placed over the detector cells D1a, D1b. These masks 36a, 36b include long, narrow openings 37a, 37b, respectively. The openings 37a, 37b are orientated so that their longitudinal axis are parallel to the centerlines of the splices in the two different plies of the tire. The detector D2 includes detector heads D2a, D2b which are similarly provided with masks 38a, 38b having openings 39a, 39b. The detector heads D1a, D2a are sensitive to splices in the ply P1 of the tire while the heads D1b, D2b are sensitive to splices in the ply P2 of the tire.

Figure 6:
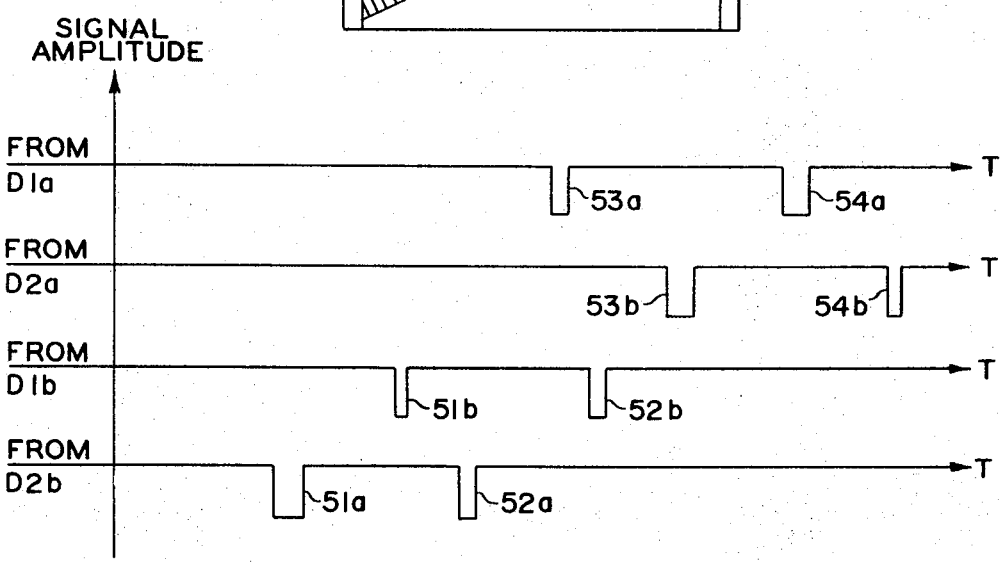
FIG. 6 is an idealized waveform diagram of signals provided during inspection of the article shown in FIG. 5.

Operation of the detector cells during inspection of the green tire is best understood by reference to FIGS. 4–6. FIG. 4 schematically illustrates the interconnection between the detectors D1, D2 and the inspection logic unit C. As was previously noted, the inspection heads D1a, D2a cooperate to inspect the ply P1 and, more particularly, the splices P1a, P1b of that ply, while the inspection heads D1b, D2b cooperate to inspect the ply P2 and its splices P2a, P2b. The inspection head D1a is connected in circuit with the logic unit C by a conductor pair 40 and the inspection head D2a is connected to the logic unit C by a conductor pair 41.

Signals indicating the strength of X-radiation received by the heads D1a, D2a are transmitted to the logic unit C through the conductor pairs 40, 41 and are processed by the unit C to produce inspection information concerning the ply P1. The detector heads D1b, D2b are connected in circuit with the logic unit C by conductor pairs 42, 43 and provide signals to the logic unit for inspection of the ply P2 of the tire G.

The X-ray tubes T1, T2 are coupled with reference detectors 45, 46, respectively (FIG. 2). The reference detectors cooperate with the detectors D1, D2 so that changes in the strengths of the X-ray beams emitted from the tubes T1, T2 are minimized in their effects on the signals from the detector heads to the logic unit. THe reference detector 45 includes reference cells 45a, 45b. The reference cells 45a, 45b are disposed inside the tire G and adjacent the tube T1, so that X-rays emitted from the tube T1 impinge directly upon these reference cells.

As illustrated schematically in FIG. 4, the reference head 45a is connected in circuit with the detector head D1a. The X-ray detection signals from the detector D1a buck the signals from the reference cell 45a, so that when the output from the cell 45a is properly adjusted, the resultant signal received by the logic circuit from the detector circuit is equal to the difference of the signal voltages produced by the detector cells 45a, D1a. The strength of the difference signal can be adjusted to any suitable value from a no signal condition to a positive or negative voltage level which is suitable for transmission to the components of the logic unit. This "bucking" technique is well known in the art to minimize source intensity variations, and no further explanations are believed necessary.

Since the signal to the logic unit is the difference between the detected X-ray strength at the detector head 45a and the head D1a, changes in intensity of the X-ray emitted from the tube T1 are ineffective to provide false information to the logic unit C. When the tire G is rotated and the ply P1 passes between the tube T1 and detector head D1a, the strength of the X-ray is detected at the head D1a, is changed, and accordingly a signal in the form of a pulse is transmitted to the logic unit C.

The construction of the standard detector head 45b and its relationship and function with respect to the head D1b is the same as described in reference to the heads D1a, 45a. Furthermore, standard heads 46a, b of the standard detector 46 and the heads D2a, D2b are identical to the detector assemblies D1 and 45. Accordingly, further description of these portions of the apparatus is omitted for brevity.

FIG. 5 illustrates a green two-ply tire 50 that has been cut transversely. The tire contains four splices P1a, P1b, P2a, P2b, the splices P1l, P1b lying in the ply P1 and the splices P2a, P2b lying in the second ply P2. As shown for purposes of illustration, the splices P1a, P2a and P1b are tapered, and the splice P2b is normal. The tire is assumed to be moving upwardly, as seen in FIG. 5, past the detectors D1, D2.

As shown, the axes of the slits 37a, 39a are substantially parallel to the axes of the splices P1a, P1b. Similarly, the axes of the slits 37b, 39b are substantially parallel to the splices P2a, P2b. Thus, the photocells D1a, D2a will respond to the passages of the splices P1a, P2b, and the photocells D1b, D2b will respond to the passage of the splices P2a, P2b.

It is particularly pointed out that a principal feature of the present invention lies in the angular orientation of the slits 37, 39. When one of the splices P1 passes one of the photocells D1a, D2a, whose respective slits 37a, 39a have axes substantially parallel to the axes of the splices P1, the signals provided from the photocells D1a, D2a have steeply rising and falling waveforms. This happens because substantially all of each slit 37a, 39a is quickly covered by each splice P1 as the tire rotates and moves the splices past the photocells. Conversely, the splices P2, as they move over the slits 37a, 39a, are substantially perpendicular to the slits and so cover only small portions of a slit 37a, 39a at any one time. Thus, the signals from the photocells D1a, D2a due to passing of the splices P2 are relatively small in amplitude, and have very sloping leading and trailing edge waveshapes. When these steeply rising and sloping waveform signals are differentiated, they of course produce signals having quite different amplitudes. That amplitude difference is utilized to determine in which cord ply the splice is located, and to route the signals to the proper channel or channels in the logic unit C. Of course, a corresponding effect occurs as the splices pass the photocells D1b, D2b.

FIG. 6 illustrates idealized waveforms of the signals produced by the photocells D1a, D1b, D2a, D2b in response to the passage of the splices P1a, P1b, P2a, P2b. In point of time, the first signal to be produced is a signal 51a produced by the photocell D2b as the wide left side of the splice P2a passes across the slit 39b. The second signal to be produced is a narrow signal 51b produced by the photocell D1b as the right side of the splice P2a passes across the slit 37b. The photocell D2b is again actuated by passage of the left side of the splice P2b to produce a signal 52a. The photocell D1a then detects passage of the narrow right side of the splice P1b to produce a narrow signal 53a. The next signal to be produced is a normal width signal 52b, caused by passage of the splice P2b past the photocell D1b. This is followed by a wide signal 53b caused by passage of the left side of the wide splice P1b past the photocell D2a. Next comes a signal 54a produced by the passage of the wide end of the splice P1a past the photocell D1a. This is followed by a signal 54b produced as the narrow left end of the splice P1a passes the photocell D2a. The signals 51–54 are provided to the logic unit C as previously noted.

The difference in time of occurrence of the two signals of each pair of signals 51, 52, 53, 54 is indicative of the angle of the splice in the tire 50. However, since the cords whose splices are being measured are machine cut, the angle of the splice is presumed to be substantially constant and the apparatus does not provide means for checking that angle. The apparatus is concerned particularly with inspecting for open splices, splices that are too wide or too narrow and splices that taper to more than a predetermined extent from side to side of the tire.

In addition to inspecting plies as described, the logic unit C is preferably equipped with suitable circuitry for counting the number of splices in each ply. In the illustrated tire only two splices may be provided in each ply and if more than two splices are detected in either ply the tire is rejected. Also, the logic unit should be sensitive to the distance between splices in each ply.

The synchronous motor M is effective to drive the apparatus A so that the tire G makes a complete revolution in 5 seconds or less. Accordingly, the inspection of the tire occurs during a period of, at most, 5 seconds, and the only additional time required for inspection is that of placing the tire in position in the apparatus 10 and removing the tire.

In FIGS. 7–10, a modified tire inspection apparatus is shown. A framework 70 has mounted thereon by suitable bushings a pair of shafts 71 and 72 on each of which are mounted a plurality of rollers 73. At each end of each of the shafts 71 and 72 there is mounted a deflector 74 for maintaining the green tire G in position on the rollers 73. A drive mechanism 76 is provided for driving the shaft 71 and a chain 77 is provided for driving the shaft 72 in response to rotation of the shaft 71. Thus, energization of the drive mechanism 76 will cause the shafts 71 and 72 and their rollers 73 to rotate with the result that the green tire G will also rotate.

A bracket 78 is positioned on one side of the framework 70 and supports a yoke assembly 79 mounting an X-ray tube 80. A similar bracket 81 is positioned on the other side of the framework 70 and mounts the yoke assembly 82 of a second X-ray tube 83. Positioned below the green tire G is a detector assembly 84 including X-ray-detecting heads 85, 86, 87 and 88. As shown for the purposes of clarity, these devices are spaced considerably below the tire G. In actual practice, it is desirable to position the devices as close as possible to the tire.

As can be seen in FIG. 10, the detector heads 87, 88 are arranged with reference to the X-ray tube 83 so that as the green tire is rotated the X-ray beams between the tube 83 and each detector head define a circumferential scan path 89 about the tire. Similarly the heads 85, 86 are arranged with respect to the X-ray tube 80 so that as the tire rotates the X-ray beams define a scan path 90 about the tire.

In one embodiment on the green tire-inspecting apparatus illustrated in FIGS. 7–10, the outputs from each of the detecting heads 85–88 are amplified and fed to an individual input of a multitrack oscillographic recorder, the traces of which serve to provide information concerning the number, nature and position of the splices in the tire. These traces are essentially the same as the detected X-ray strength vs. time functions illustrated in FIG. 6 although the traces may be of different proportion depending on the circuitry for processing the signals.

It is apparent that the recorder can be replaced by a logic unit such as the unit C described in reference to FIGS. 1–6. Regardless of the equipment associated with the apparatus, the detectors 85, 87 and 86, 88 cooperate so that one pair inspects splices in one ply of the tire G and the other pair inspects splices in the second ply of the tire.

The organization of the inspection equipment of FIGS. 7–10 is such that tires can be loaded onto the apparatus from one end and removed from the opposite end since the X-ray tubes 80, 83 are positioned axially from the ends of a tire at all times, see FIG. 8.

Although preferred embodiments of the invention have been described with a certain degree of particularity, it is understood that the present disclosure of these preferred forms has been made only by way of example and that numerous changes in details of construction and arrangement of parts may be resorted to without departing from the spirit and scope of the invention as hereinafter claimed.

I claim:

1. A system for inspecting ply splices in a wall of a tire by detecting changes in X-ray transparency of the wall comprising:
    a. means for rotatably mounting said tire;
    b. an X-ray source positioned adjacent said wall on one side thereof for passing X-rays therethrough;
    c. detector means positioned adjacent another side of said wall for receiving X-rays passing therethrough, said detector means producing output signals representative of intensities of X-rays impinging thereon, said intensities of X-rays impinging thereon, said intensities being dependent on X-ray transparency characteristics of said wall as it passes between said source and said detector means;
    d. masking means for confining X-ray detected by said detector means to a beam intersecting said wall over a narrow elongate area having a width which is substantially the same as widths of normal splices in one ply of a tire whereby passage of a splice in the ply through said beam abruptly changes the detected intensity of said beam;
    e. means electrically coupled to said detector means for indicating values of said output signals; and
    f. drive means connected to said means for mounting said tire for rotating said tire at a predetermined controlled speed, whereby widths of said output signals are representative of widths of ply splices.

2. Apparatus for inspecting splices in a ply of a tire comprising:
    a. structure for supporting and rotating a tire about its axis;
    b. an X-ray-producing device positioned to direct X-rays toward a single thickness of a wall of said tire as said tire is rotated;
    c. an X-ray-detecting assembly for detecting the intensity of X-rays which have passed through said wall;
    d. masking means between said X-ray device and said detecting assembly for passing a portion of said X-rays to said detecting assembly;
    e. said masking means defining a narrow elongate slit through which X-rays pass, said slit oriented with respect to said tire wall so that slit is substantially parallel to a normal splice in a first ply when the splice is between said X-ray device and said detecting assembly, the detected X-ray intensity being substantially changed in response to a normal splice in said first ply of said tire passing between said X-ray device and said detecting assembly to thereby produce inspection information;
    f. said slit in said masking means oriented transversely to splices in a second ply of said tire so that detected intensity of said X-rays is substantially unaffected when a splice in said second ply passes between said X-ray device and said detecting assembly, whereby only splices in the first ply of said tire are inspected by means of X-rays passing through said masking means.

3. Apparatus as defined in claim 2 further including X-ray-directing means for directing X-rays through said tire wall at a second location spaced axially along said tire from the location at which X-rays pass through it to said detecting assembly, a second detecting assembly for detecting X-rays passing through said wall at said second location, and second masking means defining a slit which is substantially parallel to a normal splice in said first ply when the splice is at said second location, a splice in said first ply substantially changing the detected intensity of X-rays passing through said slit in said second masking means, detected intensities of X-rays by said second detecting assembly remaining substantially unaffected when a splice of said second ply is at said second location.

4. Apparatus as defined in claim 2, further including a second detecting assembly and second-masking means for passing X-rays from said X-ray device to said second-detecting assembly, said second masking means defining a second slit which is oriented so that detected intensity of said X-rays is substantially changed in response to passage of a splice in said second ply between said X-ray device and said second detecting assembly thereby producing inspection information concerning the construction of said splice; said slit in said second masking means being oriented with respect to splices in said first ply so that the detected intensity of said X-rays by said second detecting assembly is substantially unaffected by splices in said first ply passing said second detecting assembly.

5. Apparatus as defined in claim 2, wherein said structure for supporting said tire includes a constant speed motor for rotating said tire at a constant predetermined speed during inspection.

6. In an apparatus for inspecting a tire containing at least first and second ply splices having first and second splices having respective first and second axes oriented in different directions in said tire, the combination comprising:
    a. a source of penetrative radiation positioned to direct radiation through said tire;
    b. means for moving said tire past said source of radiation;
    c. a photocell positioned to receive said radiation directed through said tire as said tire moves past said photocell;
    d. masking means masking said photocell and having a slit therein, said slit having a longitudinal axis substantially aligned with said first axis when said first splice is between said source and said photocell and extending transverse to said second when said second splice is between said source and said photocell, said slit having a transverse width which is small as compared to its length;
    e. said first splice moving between said source and said photocell to substantially change the intensity of radiation passing through said slit and detected by said photocell, said second splice moving between said source and said photocell and having substantially no effect on the radiation intensity passing through said slit and detected by said photocell; and f. said photocell providing a usable output signal in response to passage of said first splice past said slit and being insensitive to passage of said second splice.

7. The combination of claim 6, further including a second photocell and second masking means masking said second photocell and having a second slit therein, said second slit having a longitudinal axis substantially aligned with said second axis of said second splice when said second splice is between said source and said second photocell and a transverse width which is small compared to its length whereby said first photocell provides a usable output signal only in response to passage of said first splice, and said second photocell provides a usable output signal only in response to passage of said second splice.

8. Apparatus for inspecting a cylindrical green tire having a plurality of plies, each ply including a splice extending generally helically in the tire with the helical paths of splices in different plies being of opposite hand so that a splice in one ply extends nonparallely with respect to a splice in another ply, apparatus comprising:
  a. X-ray-directing means for directing X-rays through a wall of a tire at locations spaced axially along a tire;
  b. first and second X-ray detectors located at said respective locations;
  c. first and second masking means interposed between respective X-ray detectors and said X-ray-directing means;
  d. each of said masking means confining X-rays detected by a respective X-ray detector to a beam which passes through a tire wall at its respective location in an area which coextends with a splice in one tire ply at said location and is transverse to a splice in another tire ply at said location, said beam area having a width which is substantially the same as or less than the width of a splice in said one ply;
  e. said masking means each providing a beam which coextends with a normal splice in the same tire ply;
  f. tire-propelling means for passing the tire wall between said detectors and said X-ray-directing means at a predetermined speed;
  g. said X-ray detectors producing electrical signals in response to changes in X-ray transparency of a tire wall produced when a splice in said one ply passes through an X-ray beam, said detectors being unaffected when a normal splice in another ply passes through said beam; and,
  h. signal-processing means for receiving signals from said detectors and producing inspection information concerning splices in said one ply.

9. A method of inspecting a tire having internal ply structures including at least a first splice extending in a first direction and at least a second splice extending in a second direction different from said first direction, said method comprising:
  a. providing an inspection station comprising penetrative radiation source means and radiation detector means;
  b. supporting said tire with at least a portion at said inspection station and creating relative motion between said station and said tire at predetermined speed whereby said tire moves relatively through said station;
  c. detecting the intensity of radiation passing through said tire in a first beam defining an area of intersection with said tire which is shaped to coextend with at least part of said first splice;
  d. detecting the intensity of radiation passing through said tire in a second beam defining an area of intersection with said tire which is shaped to coextend with at least part of said second splice;
  e. producing inspection information concerning said splices in response to changes in the detected intensities of the beams caused by said first and second splices passing through said first and second beams respectively at a predetermined speed; and
  f. moving said first and second splices through said second and first beams respectively without producing sensible signals whereby said splices are individually inspected.

10. A method as claimed in claim 9 wherein said first beam has a width approximately the same as or less than the width of said first splice and a length which is substantially greater than the width of said second splice, and relatively moving said tire and said station comprises moving said first splice abruptly into and out of said first beam to substantially change said beam strength for producing said information and gradually moving said second splice into and out of said first beam whereby said beam strength is gradually diminished and no information is produced.

11. The method of claim 9 further including detecting radiation passing through said tire in a third beam defining an area of intersection with said tire which is shaped to coextend with part of said first splice spaced from said first beam, producing inspection information concerning said first splice as it passes through said third beam and comparing that information with information produced when said first splice passes through said first beam.

12. A method of inspecting a splice in a ply of a tire comprising:
  a. providing a beam of X-rays;
  b. directing said X-rays toward and through a tire to be inspected;
  c. producing relative movement at a known speed between the tire and said X-ray beam, whereby said X-rays penetrate said tire along a continuous path;
  d. detecting the intensities of X-rays which have passed through the tire along said path in a beam having a width which is substantially the same as the width of a normal splice in a ply of said tire;
  e. orienting said detected X-ray beam so that its width is coextensive with the width of said normal splice; and
  f. obtaining dimensions of a splice in the tire along said path as a result of the change in density of the tire created by the splice as reflected by changes in the detected intensity of said X-rays 13. The method defined by claim 12 further including detecting a width of a second X-ray beam which is substantially the same as a width of a normal splice in a second ply of said tire, and orienting said second beam with its width coextending with the width of said normal splice in said second ply, said second detected beam extending generally transversely of a splice in said first ply.

UNITED STATES PATENT OFFICE
CERTIFICATE OF CORRECTION

Patent No. 3,614,432                     Dated  October 19, 1971

Inventor(s) Donald T. Green

It is certified that error appears in the above-identified patent and that said Letters Patent are hereby corrected as shown below:

Column 1, line 67 after "minimum" insert --amount--.

Column 3, line 70 delete the entire line.

Column 4, line 7 "of" should be --for--;

line 9 "tube" should be --tubes--;

line 17 "block" should be --blocks--;

line 24 "displaced" should be --disposed--;

line 73 "axis" should be --axes--.

Column 5, line 65 "Pll" should be --Pla--;

line 74 "P2b" should be --Plb--.

Column 7, lines 57 and 58 delete "said intensities of X-rays impinging thereon,";

line 61 "X-ray" should be --X-rays--.

Column 8, line 11 after "that" insert --the--;

line 70 after "second" first occurrence insert --axis--.

Signed and sealed this 9th day of May 1972.

(SEAL)
Attest:

EDWARD M. FLETCHER, JR.            ROBERT GOTTSCHALK
Attesting Officer                  Commissioner of Patents